J. Johnson,

Bolt Cutter.

No. 4,299. Reissued Mar. 14. 1871.

Witnesses.
P. E. Wilson
John S. Hyer

Jesse Johnson
By his Attorney
Chas. F. Bansbury

N. PETERS, PHOTO-LITHOGRAPHER, WASHINGTON, D. C.

UNITED STATES PATENT OFFICE.

JESSE JOHNSON, OF COCHRANSVILLE, PENNSYLVANIA.

IMPROVEMENT IN DEVICES FOR CUTTING BOLTS AND RIVETS.

Specification forming part of Letters Patent No. 65,391, dated June 4, 1867; Reissue No. 4,299, dated March 14, 1871.

*To all whom it may concern:*

Be it known that I, JESSE JOHNSON, formerly of West Fallowfield, now of Cochransville, in the county of Chester and State of Pennsylvania, have invented an Improved Bolt-Cutter; and I do hereby declare the following to be a full and correct description of the same, reference being had to the accompanying drawings, in which—

Figure 1:
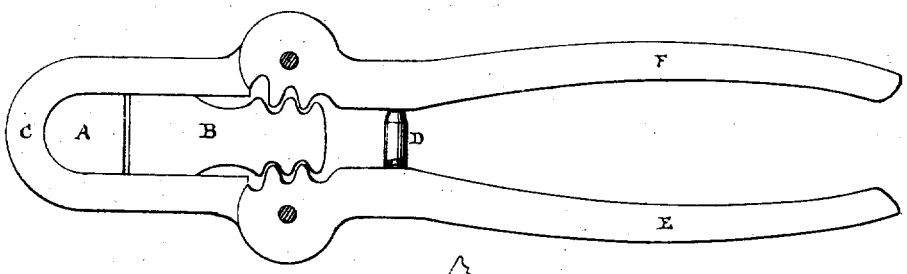
Figure 2:
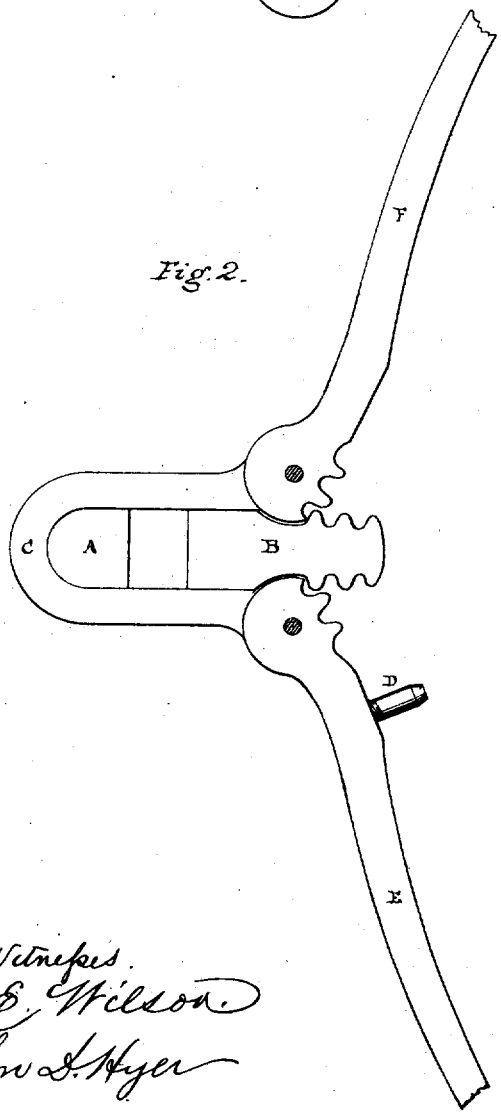
Figure 3:
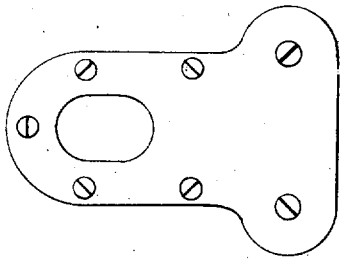
Figure 4:
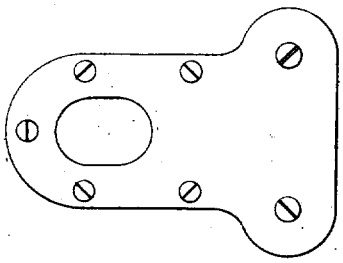

Figure 1 is a view of the implement with its jaws forced together, as when the operation of cutting a bolt or rivet has been performed. Fig. 2 shows the jaws or cutters drawn apart preparatory to receiving a bolt or rivet to be cut. Figs. 3 and 4 show the top and bottom plates that cover the knives and frame, and keep the knives in place.

The same letter indicates the same part in whatever figure it occurs.

A marks a stationary knife, made of steel, and fixed in the head of the frame. B is a movable knife, also made of steel. These knives are held in place by the top and bottom plates, Figs. 3 and 4, and may be readily removed by unscrewing those plates. C is the iron frame which incases the knives, and to which the top and bottom plates are attached. E and F are levers pivoted to the frame and plates, and having toothed segments at their fixed ends, the teeth of which engage with teeth on the sides, and near the end of the movable knife B. D is a pin attached to lever E to prevent the levers from coming too near together, and thus limit the movement to the knife B, so that it shall not strike against the knife A, to the injury of both.

Having thus fully described my invention, what I claim, and desire to secure by Letters Patent, is—

1. As my improvement in bolt-cutting devices, the combination of the toothed stock of the movable cutter, integral therewith or otherwise, and the toothed segment-levers, arranged and operating therewith, substantially as described.

2. The combination of knives A and B with levers E and F, screw D, frame C, and top and bottom plates, Figs. 3 and 4, all constructed, arranged, and operating in the manner and for the purpose shown and explained.

The above specification of my said invention signed and witnessed, at Cochransville, this 28th day of November, A. D. 1870.

JESSE JOHNSON.

Witnesses:

JOHN GILFILLAN,

JOHN B. STEWART.